UNITED STATES PATENT OFFICE.

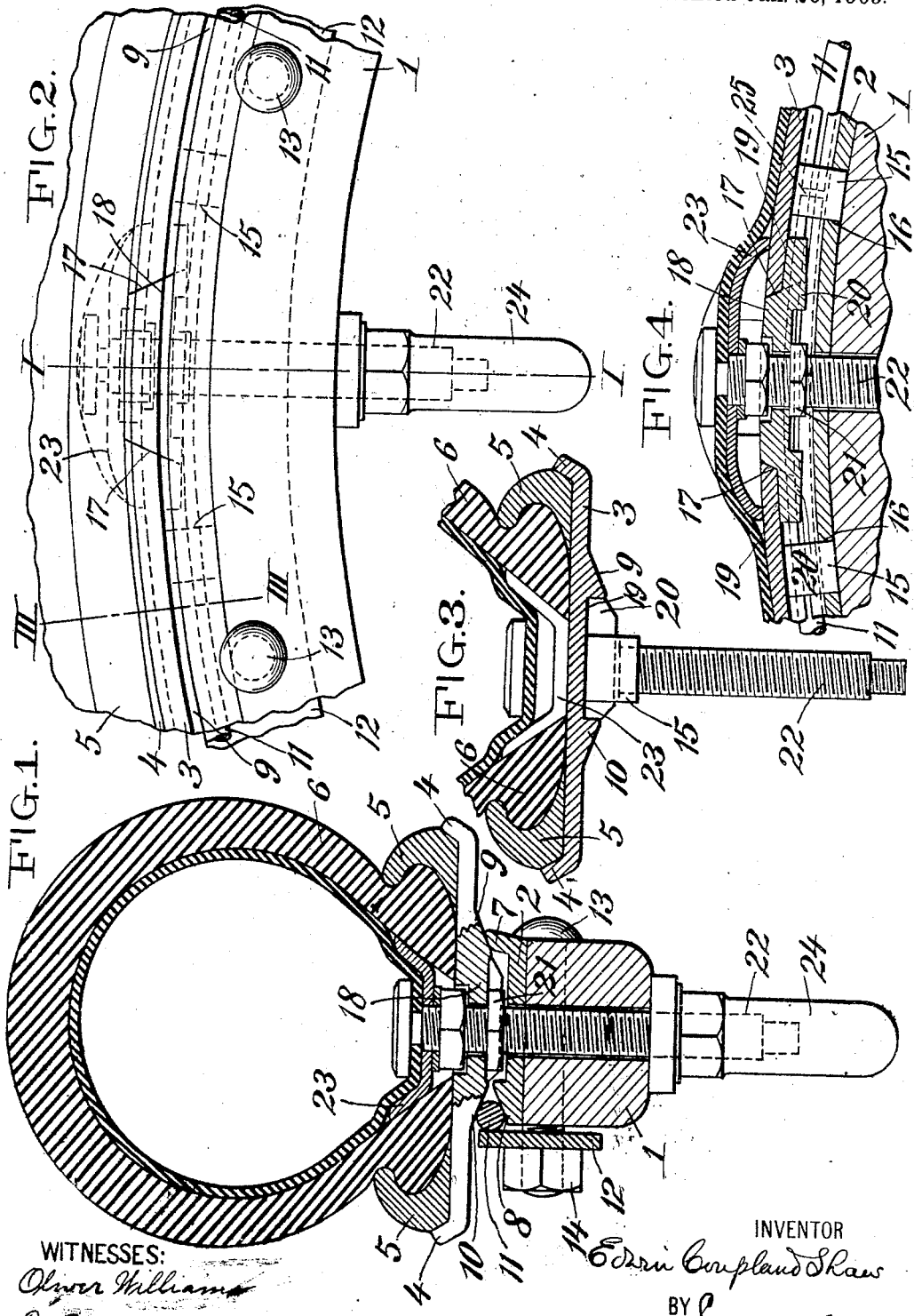

EDWIN COUPLAND SHAW, OF AKRON, OHIO, ASSIGNOR TO THE B. F. GOODRICH COMPANY, OF AKRON, OHIO, A CORPORATION OF OHIO.

VEHICLE-WHEEL RIM.

No. 910,733.    Specification of Letters Patent.    Patented Jan. 26, 1909.

Application filed May 25, 1907. Serial No. 375,717.

*To all whom it may concern:*

Be it known that I, EDWIN COUPLAND SHAW, a citizen of the United States, and a resident of the city of Akron, in the county of Summit, State of Ohio, have invented certain new and useful Improvements in Vehicle-Wheel Rims, (Case AJ) of which the following is a specification, reference being had to the drawings forming a part thereof.

My invention relates to that class of vehicle wheel rims shown and described in my applications, Serial Numbers 375,715 and 375,716, filed of even date herewith, and is for a modification of the general form of structure therein claimed.

As stated in the above named cases, rims of this character comprise generally speaking, a rim fixed to the felly and a detachable rim capable of being easily removed from or attached to the fixed rim and provided with means for readily engaging or disengaging a tire. The combination of these two means in one device is of special advantage.

More specifically this invention contemplates the provision of a split removable rim combined with detachable annular tire retaining flanges the rim being capable of contraction to free it from the flanges and of expansion to cause it to clamp the flanges and hold itself, the flanges and the tire in a unitary self-contained structure in which the tire may be inflated and the whole carried from place to place ready to be immediately substituted for a damaged tire whenever necessary.

Means are also provided in the shape of a locking ring which may be retained in place by a keeper, for holding the two rims in engagement. In this modification an endless keeper ring is used for holding the locking ring in place.

This invention also contemplates the use of a specially formed key piece for spreading the ends of the detachable split flange apart and holding them in proper position.

It is to be understood however that the invention is not limited to the specific forms selected for purposes of illustration but that the different parts may be freely modified so long as their several functions are performed relatively to each other without altering the effective combination of elements.

In the drawings, Figure 1 is a transverse section through a felly and rim embodying my invention and showing a tire of the usual clencher type in place upon the rim, though it is to be understood that the parts may be so formed as to engage any other form of tire. The section is taken on line I—I of Fig. 2. Fig. 2 is an elevation of a fragment of a felly and rim constructed in accordance with my invention showing a portion of the tire, the valve stem in dotted lines and the valve casing. Fig. 3 is a section of the detachable rim and foot of the tire showing the valve stem and taken on line III—III of Fig. 2. Fig. 4 is a central longitudinal vertical section of the fixed and detachable rims and the clip and key piece shown in Fig. 2.

Referring to the drawings by reference numerals, 1 is the wheel felly to which is permanently attached in any usual or suitable manner the fixed rim 2.

3 is the detachable split rim having upstanding flanges for laterally supporting tire retaining flanges 5. These flanges 5 are endless annular rings shaped to engage the foot of the tire which it is desired to use, in this case shown as a clencher tire 6. The fixed rim is provided on one edge with a flange 7 having an inclined upper face and the other edge is provided with a surface 8 inclined in the same general direction as the flange surface. The detachable rim is provided with an inclined surface 9 adapted to engage the flange 7 and with an inclined surface 10 opposed to the surface 8 but inclined in an opposite direction thereto. A locking ring 11 is inserted between the surfaces 8 and 10 and serves to wedge the two rims in fixed engagement. This locking ring is shown in this case as of circular cross section though it is obvious that other forms may be substituted for it and is preferably transversely split as shown at 25 in Fig. 4. An endless keeper ring 12 is used to hold this locking ring in wedging position, bolts 13 being passed through holes in the felly and the keeper ring, and having nuts 14 threaded on their outer ends and bearing against the keeper ring. Near each end of the detachable rim 3 is formed or fixed a lug 15 each lug fitting into an appropriate socket 16 formed in the fixed rim 2. The ends of the detachable rim are inclined towards each other from the inside outward as shown at 17. A key piece 18 is used to fit between these inclined ends 17 and keep them spread apart, the key piece being constructed with faces of the same incline as the ends 17 thus forming a wedge to force the ends 17 apart. This key piece 18 has a tongue 20 projecting from each of its inclined ends adapted to fit in the groove 19 which is formed in the detachable rim between the inclined surfaces 9 and 10 above referred to. The key piece is held in its normal position between the ends of the detachable ring by means of a nut 21 which is screwed on to the valve stem 22 which is of usual form. The upper end of the valve stem carries the usual clip 23. A dust cap 24 is shown on the inner end of the valve stem.

The operation of the device is as follows: When it is desired to remove the rim and tire from the wheel, nuts 14 are unscrewed and the dust cap 24 taken off. Keeper ring 12 can then be slipped off the bolts 13 and the locking ring 11 taken away when the detachable rim and tire can be slipped off from the fixed rim at the side opposite from the valve stem and raised, thus lifting the valve stem from its opening in the felly. To remove the tire from the rim, the nut 21 is removed allowing the key piece 18 to be slipped down the valve stem and out of engagement with the ends of the split rim. The ends of the split rim can now be drawn together and overlapped so as to materially reduce the diameter of the rim thus permitting the retaining flanges 5 and the tire to be readily slipped off over the flanges 4. A new tire can then be put in place and the parts adjusted in reverse order till they are in the position shown in the drawings. The tire may be put on the detachable rim and inflated as shown in Fig. 3, and the key piece drawn into place by the nut 21 when the tire, detachable rim and key piece will be firmly held in fixed relation and carried wherever desired so that it is always possible to have an inflated tire and rim ready to apply to the wheel whenever needed.

Having thus described my invention what I claim is:

1. In combination in a vehicle wheel, a fixed rim, a detachable split rim, said rim capable of being contracted and expanded, a pair of annular tire retaining flanges supported by said detachable rim, and formed for engagement with the tire, and a key piece for engagement with the ends of said detachable rim, said key piece being provided with projections to take under the said ends.

2. In combination in a vehicle wheel a fixed rim, a split detachable rim capable of being contracted and expanded, tire retaining flanges supported by said rim and formed for engagement with the tire, the ends of said detachable rim being inclined towards each other outwardly and a wedge shaped key piece having similarly inclined ends adapted to fit between the rim ends, said key piece being provided with projections adapted to take under the ends of said rim and means for holding said key piece in engagement with the said ends.

3. In combination in a vehicle wheel, a fixed rim, a split detachable rim carrying tire engaging means and provided in its under side with a circumferential groove and a key piece engaging the ends of said split rim, and provided with projections fitting said groove.

4. In combination in a vehicle wheel, a fixed rim, a split detachable rim, a tire, means for fastening the tire to the split rim, a valve stem for the tire, a clip on the end of the valve stem, a key piece apertured to receive the valve stem, projections on the key piece to take under the ends of the split rim, and a nut on the valve stem for supporting the key piece between the ends of the split rim and means for preventing circumferential movement of the split rim.

5. A detachable rim for a vehicle wheel comprising a transversely split tire-seating member and a key piece engaging the ends of said member, said key piece having an outer face of substantially the same transverse contour as the outer face of the tire-seating member, and provided with projections to take under the ends of said member.

EDWIN COUPLAND SHAW.

Witnesses:
    ARTHUR E. DAVISON,
    WALTER K. MEANS.